Figure 1:
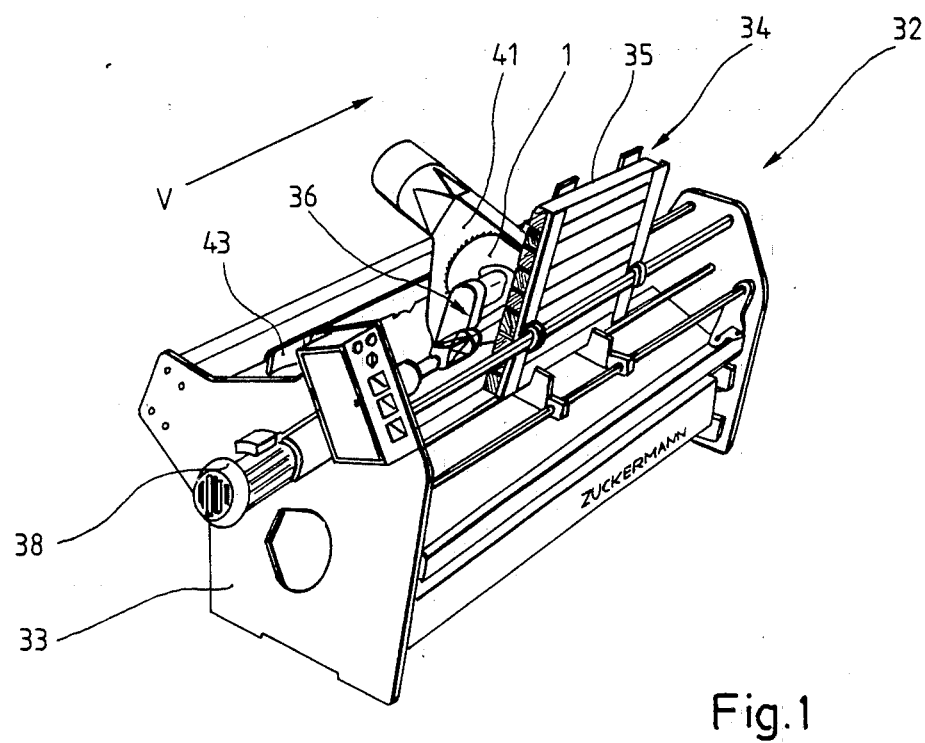

United States Patent [19]

Schmidt

[11] Patent Number: 4,585,043
[45] Date of Patent: Apr. 29, 1986

[54] TURNING TOOL FOR TURNING WOODEN WORKPIECES

[75] Inventor: Erich Schmidt, Mauerbach, Austria

[73] Assignee: MZW Maschinenfabrik GmbH, Vienna, Austria

[21] Appl. No.: 566,821

[22] Filed: Dec. 29, 1983

[30] Foreign Application Priority Data

Dec. 30, 1982 [DE] Fed. Rep. of Germany ....... 3248702

[51] Int. Cl.⁴ ............................................. B27G 15/00
[52] U.S. Cl. ...................................... 144/218; 83/853
[58] Field of Search ................... 83/853, 855; 144/218, 144/241, 230; 241/293, 294, 295; 407/27, 51, 52

[56] References Cited

U.S. PATENT DOCUMENTS

| | | | |
|---|---|---|---|
| 2,090,879 | 8/1937 | Thornton | 144/218 |
| 2,963,060 | 12/1960 | Walther | 144/218 |
| 3,294,132 | 12/1966 | Little | 144/218 |

FOREIGN PATENT DOCUMENTS

| | | | |
|---|---|---|---|
| 3138984 | 12/1981 | Fed. Rep. of Germany . | |
| 8128655 | 4/1983 | Fed. Rep. of Germany . | |
| 425183 | 5/1967 | Switzerland | 144/218 |

Primary Examiner—Francis S. Husar
Assistant Examiner—Jorji M. Griffin
Attorney, Agent, or Firm—Finnegan, Henderson, Farabow, Garrett & Dunner

[57] ABSTRACT

A turning tool for turning wooden workpieces, comprising a turning disk fixedly mounted on a drive shaft and including a plurality of carbide cutting teeth separated from one another by respective tooth spaces, said cutting teeth being in the form of at least two different configurations, one such configuration comprising peripherally disposed profile cutters having peripheral, end, and lateral cutting edges, while the other configuration comprises chip cutters formed with peripheral and end cutting edges, said chip cutters being associated with said profile cutters in a radially inwards and, in the feed direction, axially forwards offset position. Each profile cutter is integrally formed with its associated chip cutter in the form of an integral metal carbide cutting tooth having a common flat front surface forming at least part of the rear wall of the tooth space preceding it in the direction of rotation, the tooth space being open-ended at both sides and extending over the full width of said turning disk.

6 Claims, 7 Drawing Figures

TURNING TOOL FOR TURNING WOODEN WORKPIECES

DESCRIPTION

The present invention relates to a turning tool for turning wooden workpieces, comprising a turning disk fixedly mounted on a drive shaft and including a plurality of carbide cutting teeth separated from one another by respective tooth spaces, said cutting teeth being in the form of at least two different configurations, one such configuration comprising peripherally disposed profile cutters having peripheral, end and lateral cutting edges, while the other configuration comprises chip cutters formed with peripheral and end cutting edges, said chip cutters being associated to said profile cutters in a radially inwards and axially forwards offset arrangement with respect to the feed direction.

Turning tools of this type are specifically employed for machining rotation-symmetrical profiles on wooden workpieces such as the legs or feet of rustic furniture. The feed of such tools takes place in the axial direction, so that the cutting action is carried out by the forward-facing lateral and end cutting edges in the feed direction. The peripheral and rearwards-facing cutting edges are effective to carry out a cutting action only during radial feed of the tool in a direction towards the workpiece. This radial feed of the tool constitutes only a relatively minor component of the total feed and is superimposed on the axial feed thereof. The turning tool is rotated and carries a substantial number of cutting teeth for achieving a high-speed cutting operation. Due to its specific construction, the tool is unsuitable for milling operations such as hobbing, surface-finishing, notching and the like.

A turning tool of the type defined above is known from German Utility Model No. 81 28 655. It consists essentially of two parallel disks having different diameters and joined to form a turning disk, with the smaller-diameter disk leading in the feed direction. The larger and smaller diameter disks are separately provided with peripheral cutting teeth in the form of profile cutters and chip cutters, respectively. Both types of cutting teeth are in the form of metal carbide tips or the like secured in a per se known manner to radial projections of the respective disks. The recesses formed between the radial projections of the respective disk constitute the tooth spaces thereof, extending, in the case of the profile cutters, over the full width of the larger-diameter disk and being open at both ends. The tooth spaces of the smaller-diameter disk are of course only open on the leading side thereof. The profile cutters are formed with a relatively narrow peripheral cutting edge arcuately connected to oblique lateral cutting edges diverging in the direction towards the drive shaft. Connected to the leading lateral cutting edge in the direction towards the drive shaft is an end cutting edge.

Each of the chip cutters is formed with a peripheral cutting edge and an end cutting edge and radially inwards and axially forwards offset with respect to the profile cutters due to its being mounted on the smaller-diameter disk.

This specific construction and arrangement of the profile cutters and chip cutters permits even strongly contoured wooden workpieces to be finished with a single tool in a single operation. The chip cutters carry out a rough turning operation for pre-shaping the desired contours, formerly requiring a separate pre-shaping operation employing a first tool, while the profile cutters carry out a final turning operation for finishing the desired contours, this operation formerly requiring a second tool employed in a second or finishing operation. The major part of the chip cutting operation is carried out by the chip cutters, so that the profile cutters are enabled to carry out the profile finishing operation by removing chips of substantially constant dimensions under relatively reduced load and with a high-quality surface finish.

An improvement of this turning tool is described in German Utility Model No. 81 28 661. In this instance, the drive shaft of the turning tool is aligned at an oblique angle in two mutually perpendicular planes relative to the axis of rotation of the workpiece. This oblique alignment results in the cutting teeth engaging the workpiece only with that portion of their cutting edges between the peripheral cutting edges and the lateral or end cutting edges, respectively, i.e. over a reduced contact area, so as to minimize the development of heat during the turning operation. In other words, this construction permits the cutting speed to be increased, and thus the surface finish of the workpiece to be improved, without the danger of "burning" the workpiece and reducing the useful life of the tool.

In practice it has been found, however, that the maximum cutting speed of this turning tool is of a magnitude at which the conventional cutters made of metal carbides or similar materials are unable to withstand the resulting mechanical loads, resulting in their becoming detached or breaking. At the same time, these high cutting speeds result in extremely fine chips, resembling sawdust, which are impossible to remove at a sufficiently high rate, so that the tooth spaces become clogged after a certain period, and the chips tend to stick together and to the teeth due to the resin contained in the wood. Specifically the chips cut by the chip cutter are not carried off quickly enough. This again results in the danger of tooth breakage being increased, and at the same time in the temperature rising to a point conducive to burning of the workpiece.

It is an object of the present invention to improve a turning tool of the type defined in the introduction in such a manner that its potential cutting speed may be fully exploited without detrimental effects on the useful life of the cutting teeth, the surface finish of the workpiece, and costs. This is accomplished by providing that each of the profile cutters is integrally formed with the associated chip cutter in the form of an integral metal carbide cutting tooth having a common flat front surface forming at least part of the rear wall of the preceding tooth space, said tooth space being open-ended at both sides and extending over the full width of the turning disk.

In contrast to formerly known turning tools having separate profile cutters and chip cutters for removing two separate fine chips, the one-piece cutting teeth of the turning tool according to the invention remove only a single and therefore more substantial chip on each passage, which is much easier expelled from the tooth spaces and less liable to adhere to the tool. The uniform flat front surface of the one-piece cutting tooth prevents the desirable greater chip from being broken up into smaller fractions. This a further improvement of the positive effects of the one-piece cutting tooth. Chip removal is further improved by the fact that the continuous flat front surface forms at least part of the rear wall of the preceding tooth space. The open-ended tooth space extending over the full width of the turning disk permits the chips to be ejected also through the rearward facing open end of the tooth space as seen in the feed direction. The combination of the above features ensures sufficiently fast chip removal at full exploitation of the potential cutting speed while preventing excessive increase of the temperature on the side of the tool as well as on that of the workpiece.

At the same time the one-piece cutting tooth, particularly in the form of an integrally formed moulding—comparable to a lathe tool—, offers the possibility of a less critical fastening method as compared to the conventional soldering method. The cutting teeth may thus be inserted into square openings formed in the turning disk and secured therein by threaded fasteners. In comparison to the formerly employed metal carbide tips, the cutting teeth of this type are able to withstand higher mechanical loads, permitting the cutting speed to be still further increased. In addition, manufacture of these cutting teeth is greatly simplified, involving for instance isostatically pressing and subsequent cutting the teeth to the required length.

According to a further embodiment of the invention, the bottom of the tooth space diverges from the drive shaft in the direction opposite to the feed direction. On the other hand, manufacture of the turning disk is greatly simplified by the bottom of the tooth space extending substantially parallel to the drive shaft. Also advantageous in this respect are forward and rearward walls of the tooth space extending substantially parallel to one another.

In order to avoid any tendency of the chips to become jammed within the tooth space, as might occur under particularly adverse conditions, the forward and rear walls of the tooth space are preferably formed so as to diverge in the direction opposite to the feed direction. In this respect it is also of advantage to form the bottom of the tooth space so as to converge with the drive shaft in the direction opposite to the feed direction.

According to a still further embodiment of the invention, the turning disk may be formed with a stop member radially projecting from the bottom of the tooth space to a point below the periphery of the cutting tooth so as to form a rearward stay for the cutting tooth in the direction of rotation, such stop member conforming to the contours of the cutting tooth and forming the forward wall in the direction of rotation of the trailing tooth space. This ensures a particularly stable and reliable support of the cutting tooth on the turning disk and greatly facilitates the manufacture of the turning disk while reducing production costs.

Figure 2:
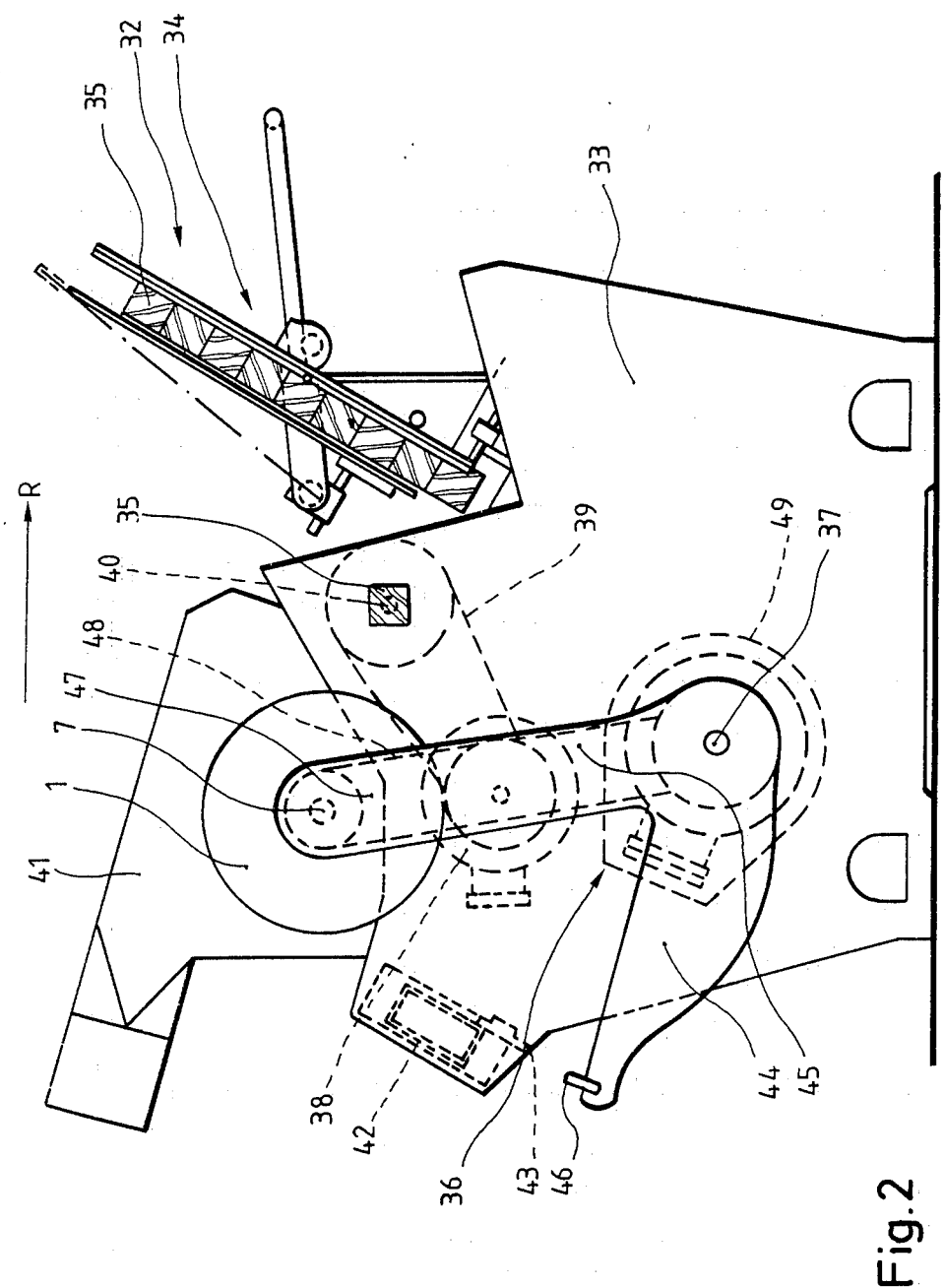
Figure 3:
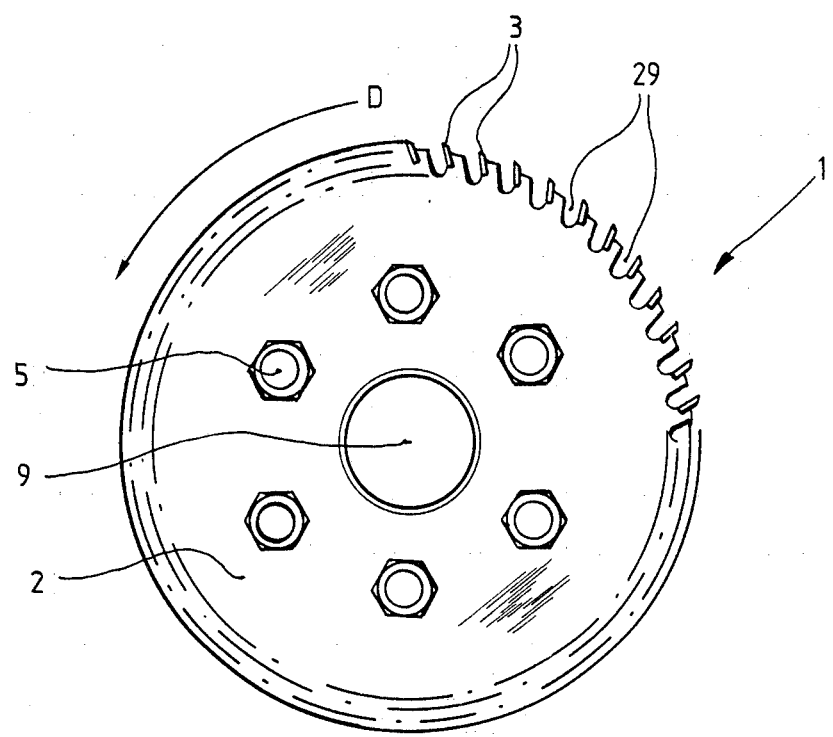
Figure 4:
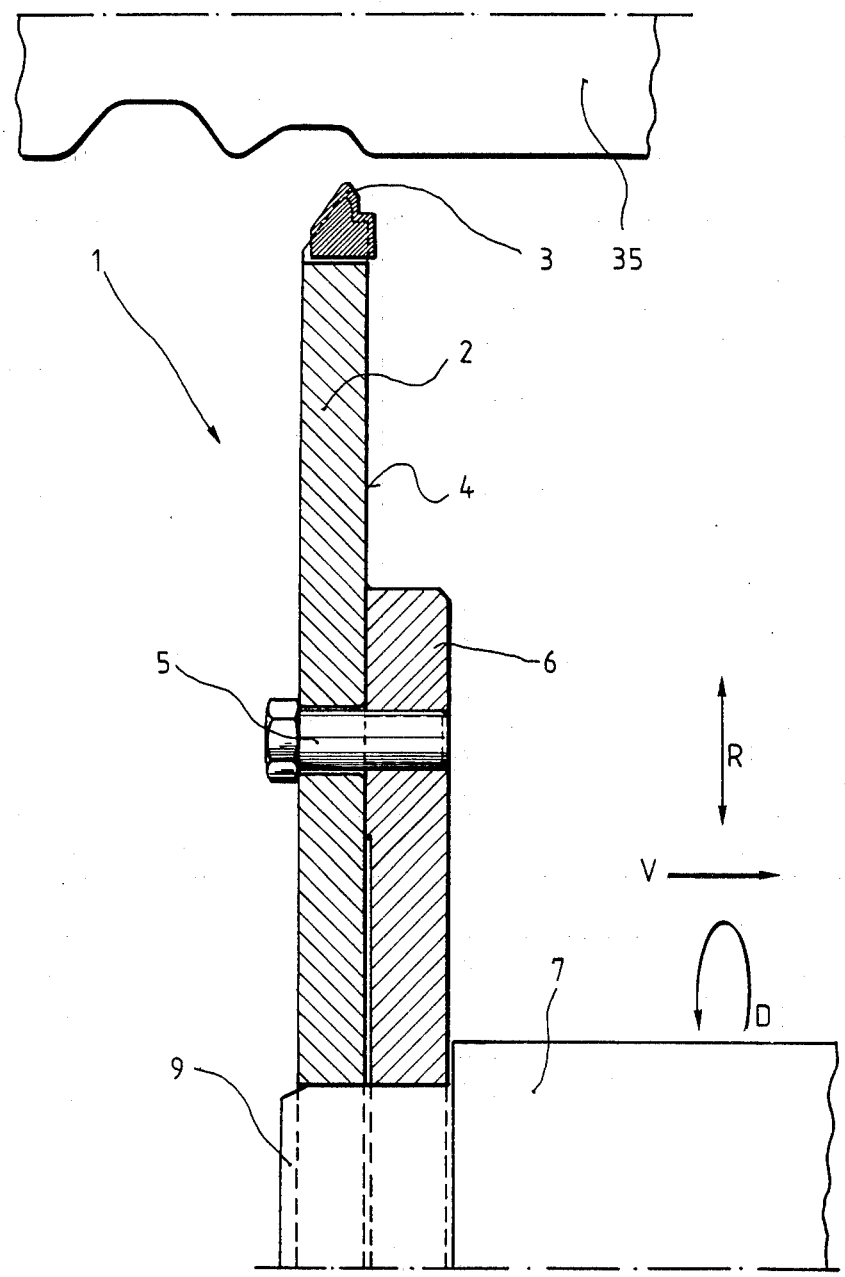
Figure 5:
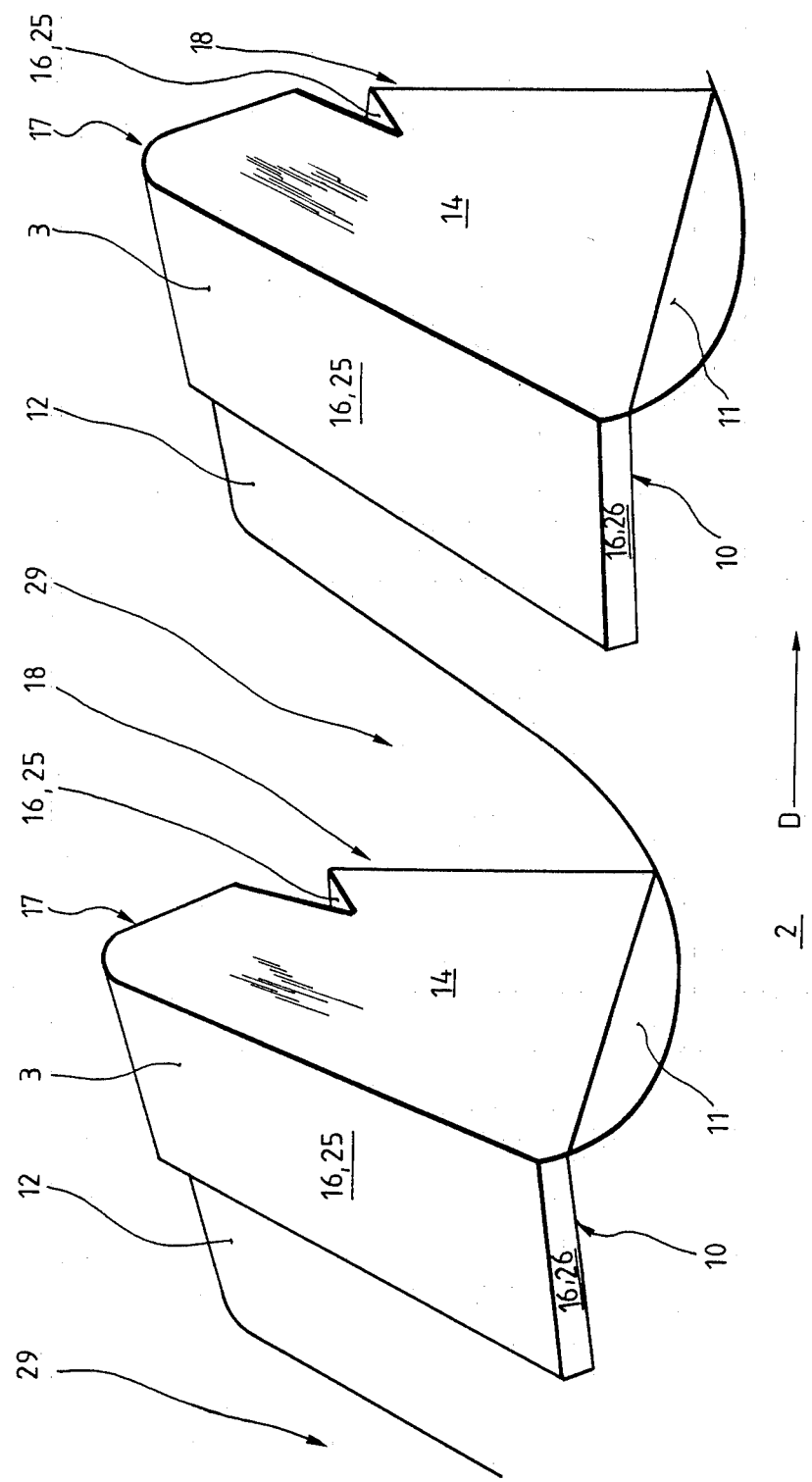
Figure 6:
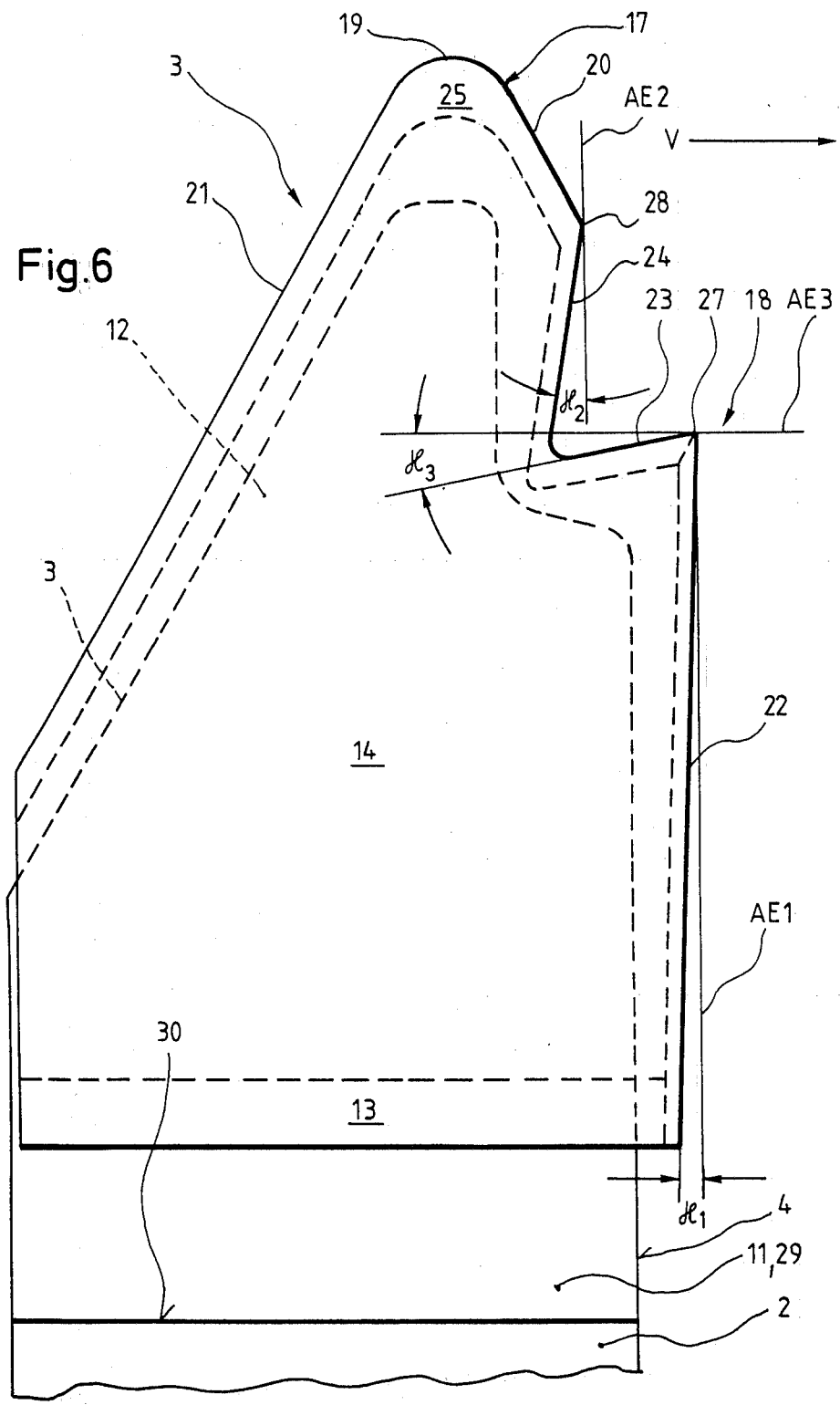
Figure 7:
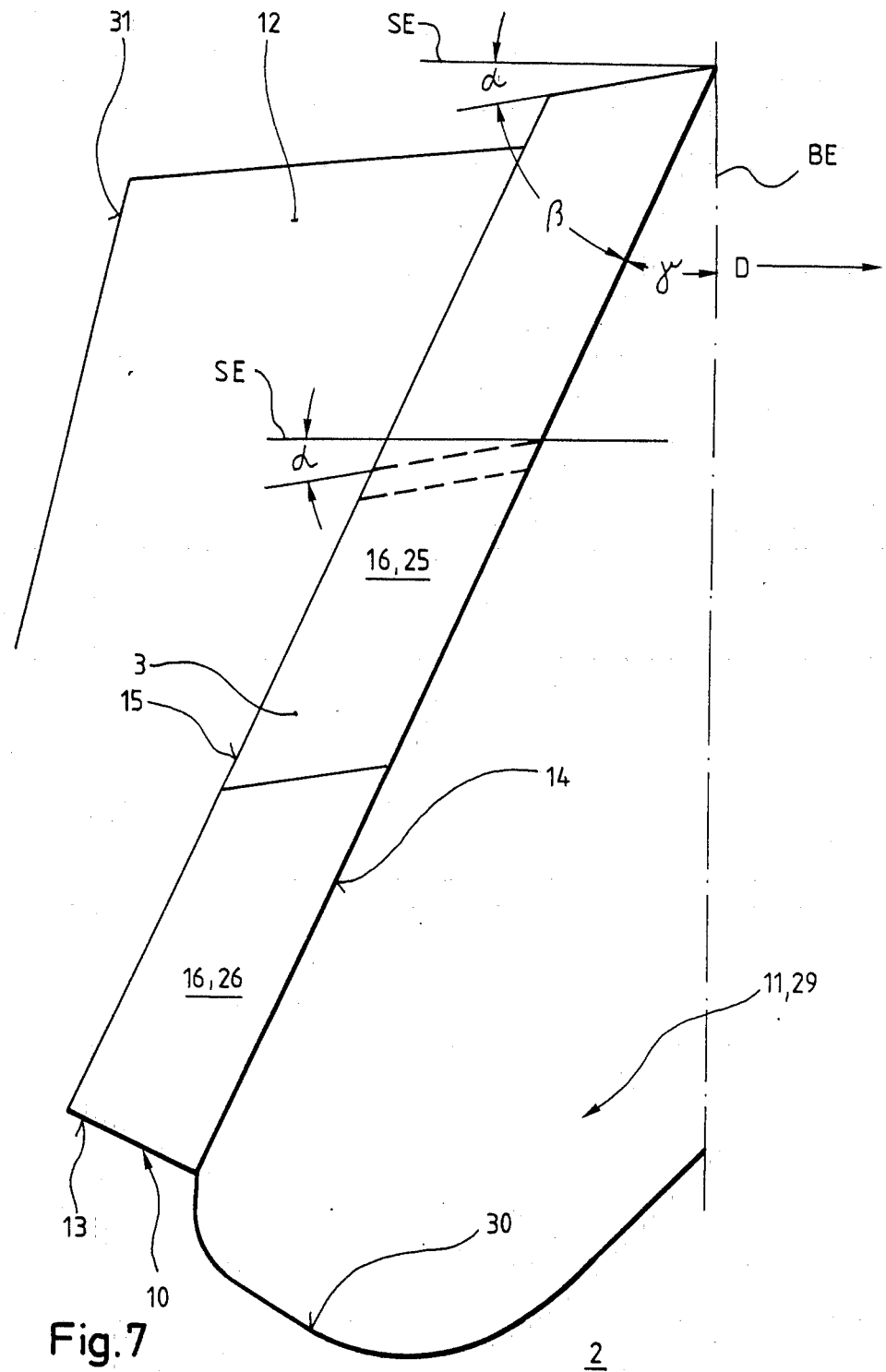

An embodiment of the invention shall now be described by way of example with reference to the accompanying drawings, wherein:

FIG. 1 shows a perspective view of an automatic turning machine equipped with a turning tool according to the invention, FIG. 2 shows a side view of the interior of the automatic turning machine of FIG. 1, showing only those parts essential for understanding the invention, FIG. 3 shows a side view of the turning tool according to the invention shown in FIGS. 1 and 2, FIG. 4 shows an axial sectional view of the turning tool shown in FIG. 3, FIG. 5 shows an enlarged detail of the periphery of the turning tool according to the invention equipped with cutting teeth in a modified version of those shown in FIG. 4, FIG. 6 shows a view of the front surface of one of the cutting teeth of the turning tool shown in FIG. 1, and FIG. 7 shows a side view of the cutting tooth shown in FIG. 6.

Shown in FIGS. 1 and 2 is an automatic turning machine 32 comprising a frame 33, an automatic loading and feeding device 34, only partially shown, for the wooden workpieces 35 to be turned, and a pivot carriage 36. Carriage 36 is mounted for pivotal movement between a rest position away from a clamped workpiece 35 and an operating position adjacent said workpiece about a horizontal pivot axis 37 in frame 32 by means of a pivot drive arrangement not shown. Feed drive means (not shown) are provided for advancing carriage 36 in an axial feed direction V along pivot axis 37. The wooden workpieces 35 to be turned are mounted in not either shown clamping means and rotated about a turning axis 40 extending parallel to pivot axis 37 by means of an electric motor 38 mounted within frame 32 via a belt drive arrangement 39. Disposed above frame 32 is a cover 41 for the turning tool 1 according to the invention, said cover being provided with a chip ejection chute. Located at the rear of frame 32 is a mounting frame for mounting a stencil 43 defining the contour of the workpiece 35 to be turned, said stencil extending parallel to pivot axis 37. Pivot carriage 36 comprises a substantially horizontal arm 44 and a substantially vertical arm 45. Mounted on top of the horizontal arm 44 is a follower pin 46 at a position opposite stencil 43. Turning tool 1 is carried by the upper end 47 of vertical arm 45 on a substantially horizontal drive shaft 7. Turning tool 1 is driven via a belt drive system 48 by means of an electric motor 49 mounted on carriage 36.

During the turning operation, pivot carriage 36 is in its operating position and advances along pivot axis 37, so that the rotating turning tool 1 moves along the rotating workpiece 35 in the feed direction V. During this operation, the contour of stencil 43 cooperates with follower pin 46 for controlling the radial movements of carriage 36 about pivot axis 37 and thus the radial movements of turning tool 1. The stroke of these radial movements is relatively small as compared to the feed movement in the axial direction V.

The turning tool 1 according to the invention comprises a one-piece turning disk 2 carrying a plurality of one-piece cuttng teeth secured thereto along its periphery. At an intermediate location between its periphery and a central mounting bore, disk 2 is formed with a plurality of bores for receiving fastening bolts 5 by means of which turning disk 2 is releasably secured to a carrier flange 6 of drive shaft 7 provided for this purpose with threaded bores. An extension 9 of drive shaft 7 projects through the central mounting bore of disk 2.

With reference to FIG. 5, the periphery of turning disk 2 is formed with projections 10 followed in the direction of rotation D by a groove 11 of substantially semicircular cross-sectional shape. Each groove 11 leads over to a further projection 12 the height of which is greater than that of projection 10. Grooves 11, projections 12 and the projections 10 located therebetween so as to form a stepped transition, are aligned parallel to the drive shaft 7 of turning disk 2.

The cutting teeth 3 are of one-piece construction, moulded of a metal carbide. They may however also be formed of oxy-ceramic materials or of other materials having similar or improved properties. Each cutting tooth 3 has a substantially rectangular planar base surface 13 (FIG. 6), a front surface 14 extending perpendicular thereto, and a similar rear surface 15 (FIG. 7). As best shown in FIG. 7, surface 14 slants forward in the direction of rotation D. The base surface 13 of cutting teeth 3 is seated on the respective projection 10 of disk 2, so that the rear surface 15 is supported by the front surface of the associated projection 12. The teeth are secured to the respective projections 10 and 12 by means of threaded fasteners not shown, or optionally by brazing, so as to radially project beyond projections 12.

The remaining or side surface 16 of cutting tooth 3 extending from base surface 13 and interconnecting front surface 14 and rear surface 15 is of contoured configuration in the axial direction of disk 2. The projections 12 of disk 2 are shaped to conform to this contour. The contours of the one-piece cutting tooth 3 define a profile cutter 17 and a chip cutter 18 the cutting edges of which are formed by the edge between front surface 14 and the remaining surface 16. The chip cutter 18 is located at a radially inwards and axially forwards offset position with respect to profile cutter 17. The radially outermost portion of cutting tooth 3 forms a peripheral cutting edge 19 of profile cutter 17. This peripheral cutting edge 19 is relatively narrow and located at an offset position in the feed direction V with respect to the center plane of disk 2. At both of its ends, cutting edge 19 forms an arcuate transition leading over to lateral cutting edges extending at oblique angles towards the end faces of turning disk 2 in the direction towards drive shaft 7. The leading lateral cutting edge in the feed direction V is designated by numeral 20, while the trailing lateral cutting edge is designated 21, the latter being of greater length than the former. Chip cutter 18 has an end cutting edge 22 leading over to a radially outer peripheral cutting edge 23 itself connected to lateral cutting edge 20 of profile cutter 17 by a connecting cutting edge portion 24. End cutting edge 22 is configured to project beyond the respective end face 4 of turning disk 2.

As best shown in FIG. 7, projections 12 and thus cutting teeth 3 are inclined in the direction of rotation D, so that the latter form a positive cuttng angle $\gamma$ between their front surface 14 and a reference plane BE of the tool, the latter extending through peripheral cutting edge 19 of profile cutter 17 perpendicular to the cutting direction of cutting tooth 3, i.e. in the plane of FIG. 6 of the drawings. The areas of surface 16 associated with cutting edges 19, 20, 21, 22, 23 and 24 form the rake surfaces of the respective cutting edges and are commonly designated by reference numeral 25. The cutting edge 21, or the rake surface associated therewith, respectively, extends to an intersection point, or edge, respectively, with the extension of the associated end face of turning disk 2. The portion of surface 16 extending from this intersection edge to base surface 13 is designated by reference numeral 26.

The rake surfaces 25 of cutting tooth 3 are of conical configuration extending in the direction towards the respective projection 12 located to the rear thereof. As a result, rake surfaces 25 include a rake angle $\alpha$ with the cutting plane SE extending through the respective point of a cutting edge perpendicular to reference plane BE of the tool. Included between rake surfaces 25 and front surface 14 is the wedge angel $\beta$ of cutting tooth 3. As already mentioned, the contours of projections 12 are similar to those of cutting teeth 3, although of generally smaller dimensions, so that a step is formed therebetween. Proceeding from this step, the projections 12 are also of conical configuration in extension of that of cutting teeth 3, the end cutting edge 22 of chip cutter 18 and the connecting cutting edge 24 leading over to profile cutter 17 extend at a rearward leading angle H1 and H2, respectively, from a cutting plane AE1 and AE2, respectively, extending through their radially outer corners 27 and 28, respectively, parallel to the plane of disk 2. Peripheral cutting edge 23 likewise extends at a rearward rake angle H3 from a cutting plane AE3 extending tangentially through cutting edge corner 27. Although not shown in the drawings, cutting edges 19 and 24 may also extend at a rearwards inclined angle $\lambda$ from the tool reference plane BE, so as to achieve a free cutting operation of tooth 3. This free cutting operation may of course also be achieved by inclining drive shaft 7 at a suitable angle with respect to the axis of rotation of the workpiece. In the embodiment shown, the cutting edge corner 27 of chip cutter 18 projects by about 1 mm beyond the leading end face 4 of disk 2 in the feed direction V, and by about 2.5 mm beyond cutting edge corner 28. Its radial distance from the radially outermost portion of peripheral cutting edge 19 is about 4 mm.

The gap formed between each cutting tooth 3 and the projection 12 preceding it in the direction of rotation D is referred to as a tooth space 29 the bottom 30 of which is formed by the bottom of the respective groove 11. The front surface 14 of cutting tooth 3 and a rear surface 31 of the respective projection 12 accordingly form the trailing and leading walls, respectively, of tooth space 29 in the direction of rotation D.

For a turning operation, turning disk 2 is rotated in the direction of rotation D. At the same time it is advanced in the feed direction V, this feed movement being accompanied by radial movements as dictated by the contours to be formed on the workpiece. During the turning operation, the chip cutter 18 of one-piece cutting tooth 3 cooperates with profile cutter 17 thereof to cut a continuous chip of predetermined dimensions. The thus cut chip is guided into tooth space 29 along the continuous flat front face 14 of cutting tooth 3, to be subsequently discharged therefrom. Due to the design of the cutting tooth including a chip cutter and a profile cutter, the cutting operation is carried out in such a manner that the major portion of the cutting operation is carried out by the chip cutter, while the profile cutter cuts a chip portion of substantially constant dimensions to finish the desired profile under reduced load operating conditions. The one-piece construction of the cutting tooth results in the formation of a chip of relatively large dimensions. The continuously flat front face 14 of cutting tooth 3 prevents the chip from breaking off and facilitates ejection of the chip from the tooth space. In addition, the ejection of the chip is also facilitated by the tooth space 29 being open at both ends and by the smooth shape of tooth shape bottom 30 and tooth space leading wall 31.

The turning tool according to the invention is useful for carrying out a high-quality turning operation without the danger of "burning", permitting a high-quality surface finish of the workpiece to be achieved at cutting speed hitherto not attainable with conventional tools.

The invention is not restricted to the embodiments shown, but can be modified in various manners. It is for instance possible to employ the turning tool according to the invention for turning other materials than wood having similar cutting properties. It is also possible to form the front face also to a smooth finish, although not planar but with a curvature for instance in the axial direction of the turning disk.

I claim:

1. A turning tool for turning wooden workpieces, comprising a turning disk fixedly mounted on a rotatable drive shaft and movable in an axial feed direction, said disk including a plurality of carbide cutting teeth separated from one another by respective tooth spaces, each said cutting tooth having at least two different cutting configurations, one configuration comprising profile cutters having peripheral, end, and lateral cutting edges, said peripheral cutting edge being generally conical and offset with respect to the center plane of the disk and forming an accurate contour to said lateral cutting edges and another configuration comprising chip cutters having a peripheral cutting edge and an end cutting edge, said end cutting edge terminating at said peripheral cutting edge and forming an acute angle therewith, said profile cutters being located on the periphery of the teeth with the chip cutters being located, relative to said profile cutters, in a radially inward and axially forward offset position with respect to the axial feed direction of the disk, whereby the chip cutters engage the workpiece before the profile cutters, each of said profile cutters being integral with its associated chip cutter and both having a common flat front surface relative to the direction of rotation of the disk, said front surface of each tooth forming, at least in part, the trailing wall of the preceding toothspace with each tooth space being open-ended on both sides and extending over the width of the turning disk and each cutting tooth being inclined in the direction of said front surface, said direction being the rotation direction of the tool.

2. The turning tool of claim 1 in which the bottom of each said tooth space extends substantially parallel to said drive shaft.

3. The turning tool of claim 1 in which the leading and trailing walls of each said tooth space extend substantially parallel to one another.

4. The turning tool of claim 1 in which the bottom of each said tooth space diverges from said drive shaft opposite to the feed direction.

5. The turning tool of claim 1 in which the leading and trailing walls of the tooth spaces diverge opposite to the feed direction.

6. The turning tool of claim 1 in which the turning disk is formed with a projection projecting radially out from the bottom of each said tooth space to form a rearward seat for said cutting tooth with respect to the direction of rotation of the disk, said projection extending to a point radially inward of the periphery of the cutting tooth and conforming to the contour of said cutting tooth and forming the leading wall in the direction of rotation of the next succeeding tooth space.

* * * * *